VARIABLE PRESETTING OF PRESET COUNTERS

Filed Jan. 14, 1966

INVENTOR.
HELMAR SCHLEIN

BY [signature]

ATTORNEY

Nov. 26, 1968 H. SCHLEIN 3,413,452

VARIABLE PRESETTING OF PRESET COUNTERS

Filed Jan. 14, 1966

2 Sheets-Sheet 2

INVENTOR.
HELMAR SCHLEIN

BY [signature]

ATTORNEY

United States Patent Office 3,413,452

Patented Nov. 26, 1968

3,413,452

VARIABLE PRESETTING OF PRESET COUNTERS

Helmar Schlein, Reseda, Calif., assignor to North American Rockwell Corporation, a corporation of Delaware Filed Jan. 14, 1966, Ser. No. 520,768

5 Claims. (Cl. 235—92)

The present invention is directed to variable presetting of preset counters and more particularly to the variable progressing or programmed presetting of digital counters.

Fixed presetting of electronic counters is well-known in the art. In such systems any variation in the counter presetting is usually done manually. In many instances manually altering the number of the counter is preset for in synchronization with a fast clock rate is difficult or impossible and some electronic means is required to accomplish the required change. The variable presetting of counters in accordance with the preferred embodiment of the present invention is accomplished by inserting N×M counts into a fixed preset counter for each cycle, where N is a whole number representing the variation in the preset count and M is the ordinal number representing the counting cycle. Such presetting progresses arithmetically.

The present invention is directed to a system which generates a sequence of groups or pulses at preselected fixed intervals of time. The group of pulses may form any one of a variety of arithmetic progressions. Thus, for example, at times $t_1$, $t_2$, $t_3$, a one, two, three, etc., pulse progression, or a two, four, six, etc., pulse progression may be generated. Such pulse sequences may also be generated in descending order starting at any preselected number. These pulses are then utilized to energize a counter so that, for example, an output pulse is initially generated for every seventh input pulse, then for every sixth input pulse., etc. In this manner a particular input pulse in the sequence may be selected so that its form or magnitude may be displayed or measured through the use of associated electronic circuitry. The present invention may also be utilized to generate a geometric progression of pulses, 1, 2, 4, 8, 16, etc.

Therefore, it is the primary object of the present invention to provide a system for generating groups of pulses in preselected numbers.

It is a further object to provide a counter system for generating a group of pulses forming an arithmetic progression.

It is another object of the present invention to provide a counter system for generating a group of pulses forming a geometric progression.

It is a still further object of the present invention to provide a counter system in which variable presetting may be accomplished.

These and other objects of the present invention will become more apparent from the following detailed description of various embodiments of the present invention taken together with the drawings, hereby made a part thereof, in which.

Figure 1:
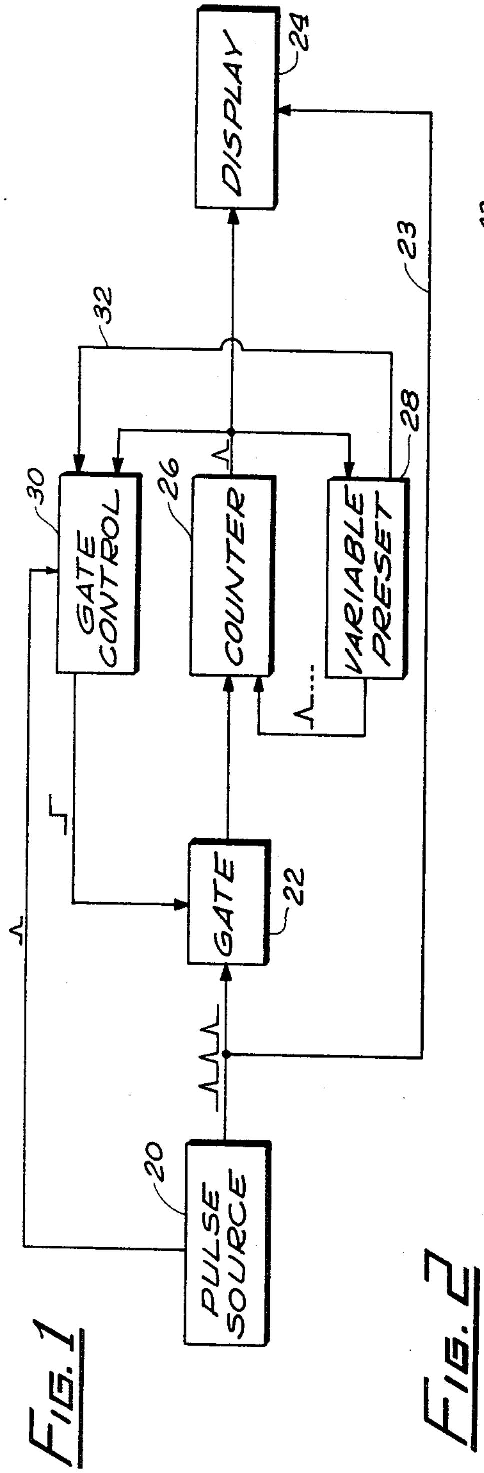
FIG. 1 is a schematic diagram of a system utilizing the variable preset counter of the present invention.

Referring now to the drawings in detail, FIG. 1 shows a system illustrating one use of the present invention. The illustrative system comprises a source of pulses 20, e.g., experimental apparatus generating a repetitive train of pulses of which selected individual pulses are to have their characteristics analyzed, having its output connected to a gate 22 and through lead 23 to a display or indicating system 24. The gate 22 functions to allow a preselected group of pulses to be connected into a standard counter 26 which counts the pulses and generates an output pulse when a preselected variable number of pulses have been received.

The preselection and variation in the number of pulses to be counted is controlled by variable preset circuit 28, described hereinafter in detail with respect to FIG. 2. The output of counter 26 is connected to variable preset counter 28 and to a standard gate control 30. The gate control 30 functions to control gate 22 so that gate 22 is opened in response to the first pulse of the train of pulses from source 20 and closed in response to the output of counter 26. In certain arrangements discussed hereinafter the gate control 30 is also disabled through lead 32 during the time variable preset 28 is counting.

Figure 2:
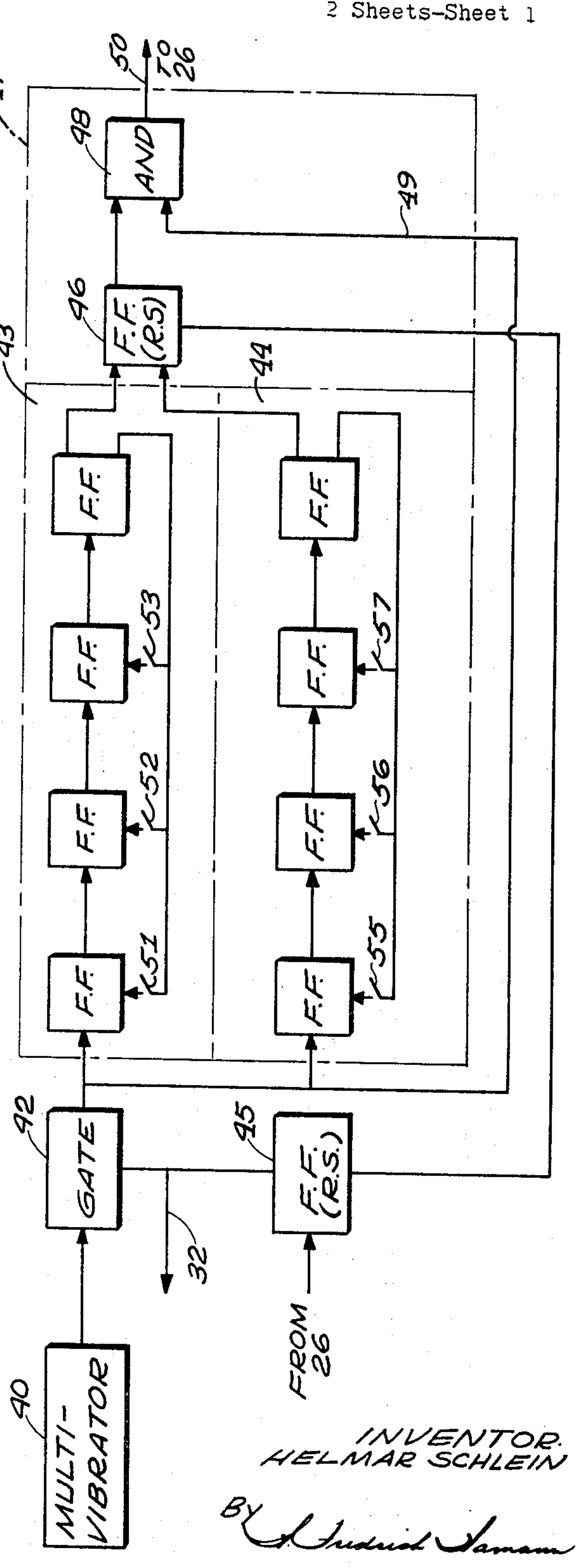
FIG. 2 is a circuit diagram of the preferred embodiment of the present invention.

The variable preset counter 28 utilized in the system of FIG. 1 is shown in detail in FIG. 2 and comprises a free-running multivibrator 40 connected through a gate 42 to the input of a counter 43 and a counter 44, each having at least one flip flop or counting unit. The gate 42 is controlled by a flip flop circuit 45 which is responsive to the output of counter 26 to open gate 42 and responsive to the output of flip flop 46 to close gate 22 thereby stopping the pulse input from source 40. The pulses passed by gate 42 are counted by counters 43 and 44 in the usual manner. However, the output of the last flip flop in each counter is connected in a feedback arrangement to one or more selected flip flops. The manner of connecting the feedback determines the number of counts required to generate the output. Thus, as an example, the four flip flops of counter 43 form a divide by ten circuit and the four flip flops of counter 44 form a divide by nine circuit. If both circuits are initially set at zero, the divide by nine circuit 44 will cycle once for every nine input pulses. The output pulse from circuit 44 is connected to control circuit 47 and will set the R.S. flip flop 46, thereby enabling the AND circuit 48. The AND circuit 48 is connected to the output of gate 42 and therefore will allow pulses to pass to output 50 during the time it is energized by flip flop 46. When circuit 43 generates an output after a count of ten the flip flop 46 will disable the AND circuit 48. Thus one pulse appears at the output 50.

The divide by ten circuit 43 is now at zero while the divide by nine circuit 44 is now at a count of one. Eight counts later the divide by nine circuit 44 passes zero and generates an output signal which enables the AND circuit 48 through the R.S. flip flop 46. Two counts later the divide by ten circuit 43 passes zero and generates an output signal which disables the AND circuit 48 through R.S. flip flop 46. Thus, since the AND circuit is directly connected to the common pulse input through lead 49, a count of two has been allowed to pass through the AND circuit 43 to the output 50. The count progresses sequentially from one through nine and repeats the cycle.

It is apparent that the cycling can be extended to cover any other range or can be recycled to one at any time by simply resetting both the divide by nine and divide by ten counters 43 and 44. Reversing the set and reset connections on the R.S. flip flop 46 will result in a decreasing rather than an increasing count. It is also apparent that by utilizing divide by eight and divide by ten circuits output pulses in a 2, 4, 6, 8, 10 . . . sequence can be generated. In a similar manner 3, 6, 9, 12, 15 or any other arithmetic progression of output pulses may be generated.

The feedback connections shown in FIG. 2 determine the divide by nine and divide by ten characteristics. For these characteristics, feedback switches 52, 53, 55, 56 and 57 are closed and switch 51 remains open. The four RST flip flops of each counter 43 and 44 ordinarily provide an output pulse for every sixteen input pulses. However, the feedback arrangement utilizes the shift in the last flip flop to reset one or more of the flip flops to an advanced setting. Thus, at count seven the state of the circuit 43 is (0111) (binary). On input count eight this is changed to (1000) and the output pulse from the last flip flop is fed back to the second and third flip flops to change the state to (1110) for a divide by ten circuit, and to the first three flip flops to change the state to (1111) for a divide by nine circuit. By varying the feedback arrangement the circuits 43 and 44 may be made to divide by *n* and dimide by *m* circuits when *n* and *m* are any integer depending upon the number of flip flops utilized in each circuit. In this manner the characteristics of circuits 43 and 44 and the common difference and number of terms in the sequence may be selectively changed.

In operation, see FIG. 1, a train of pulses, e.g., twenty pulses representative of various characteristics and changes in characteristics of an experiment illustrated as source 20, is connected to gate 22. The initial pulse from source 20 energizes gate control 30 so that the normally closed gate 22 will allow the pulse train to be counted by counter 26. Counter 26, e.g., comprised of four standard flip flop circuits and therefore capable of counting sixteen counts, ordinarily generates an output pulse upon receiving the sixteenth pulse. If a display, pulse height indication, or other measurement of one of the first sixteen individual pulses in a series of pulses, or portions of a repetitive analog signal with respect to time is required, the preset of counter 26 would ordinarily have to be manually changed after each display or measurement. However, utilizing the variable preset of the present invention, the preset may be automatically changed. Thus, for example, if the second, fourth, sixth, etc., pulses of twenty pulse trains were to be displayed, the variable preset 28 would be preset to generate a pulse series, 14, 12, 10 . . . etc., while the counter 26 would be initially set to zero. Variable preset 28 is then independently energized to feed 14 pulses into counter 26 so that counter 26 is now preset to generate an output upon receipt of two pulses from source 20. Thus, preset 28 would contain divide by sixteen and divide by fourteen circuits, for example, while counter 26 is a divide by sixteen circuit. After initially counting these two pulses counter 26 would pass through zero and generate an output pulse which would momentarily enable display 24 to display the second pulse, would energize variable preset 28, and would close gate 22. The variable preset 28 would then generate an output of twelve pulses which would be counted by counter 26 so that counter 26 would contain twelve counts and four more counts would generate an output pulse.

Upon initiation of the second train of twenty pulses gate 22 is again opened and the counting sequence is again started. However, the counter 26 now contains twelve pulses so that four pulses from source 20 are required before the display 24 is momentarily energized to record the fourth pulse. The same sequence is repeated for the sixth, eighth, tenth, etc., pulses. This operation is continued until all of the desired pulses are displayed or several cycles are run. In this manner, by selecting the number of pulses generated in the progression from variable preset 28, the counter 26 will initiate a display of an arithmetic progression of the pulses from source 20 so that selected pulses or portions may be displayed and compared to study the change in characteristics represented by the pulse form or height. It is apparent that the initial pulse to be displayed may be selected from any part of the train of pulses from source 20, e.g., the ninth or sixth pulse. Further, the difference between successive selected pulses may be varied at will by using an appropriate feedback arrangement on the two counters of variable preset 28.

While the sequence of pulses from source 20 is to be displayed in descending order, e.g., fourteen, twelve, ten, eight, etc., there is a need for disabling gate control 30 by inhibiting gate control 30 through lead 32 from responding to a zero crossing output from counter 26 which results while counter 28 is running. Thus, the disabling of gate control 30 is required only if a zero crossing results while variable preset 28 is running.

Figure 3:
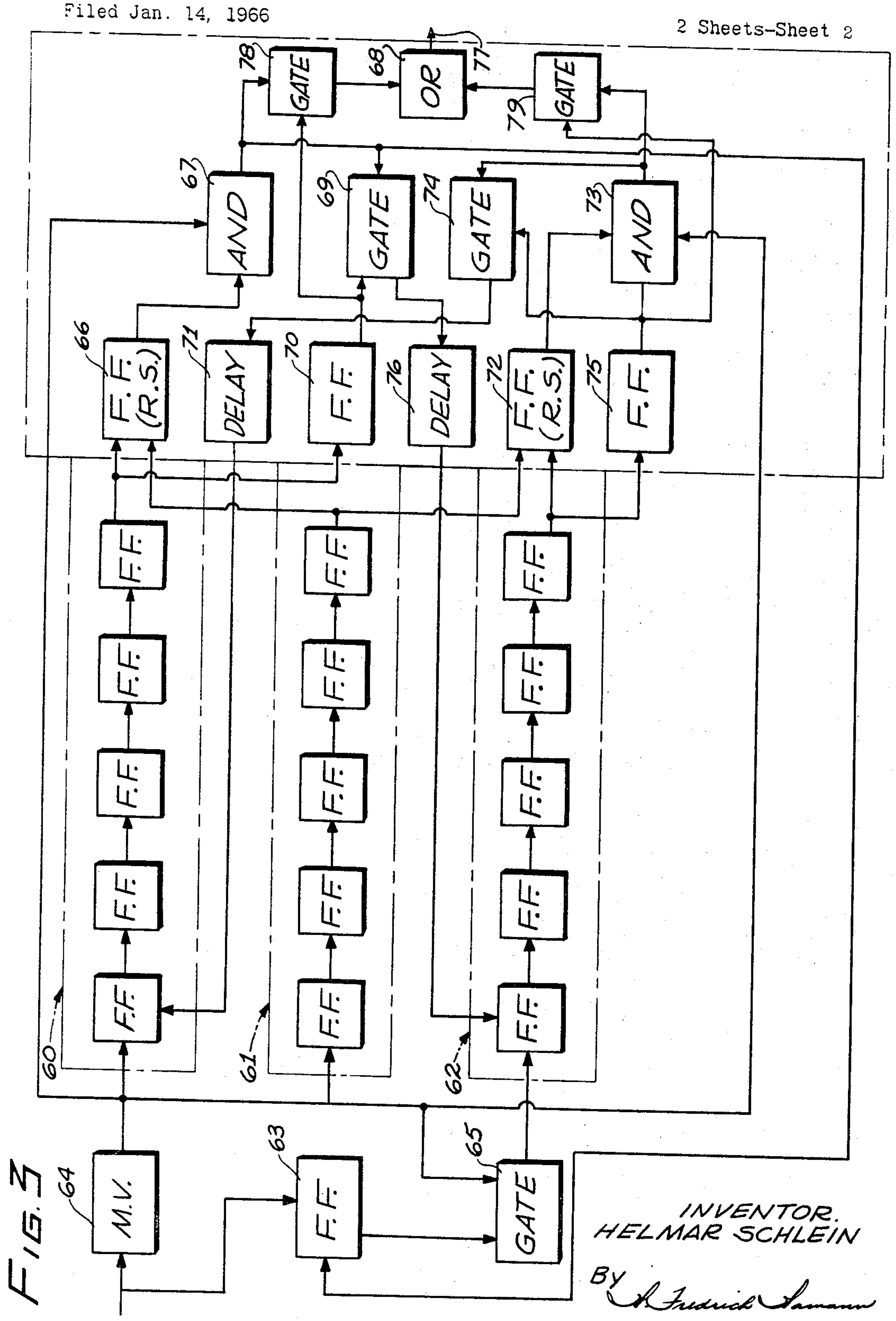
FIG. 3 is a second embodiment of the pulse generating system of the present invention.

The circuit arrangement of FIG. 2 may also be modified to provide an output which is a geometric progression of pulses. This modification is shown in FIG. 3 where three counter circuits 60, 61 and 62, each containing five RST flip flops, for example, have their outputs connected to a control circuit 59, and their inputs connected to the output of a multivibrator 64 which is started from some source not shown, e.g., the experimental apparatus illustrated at 20 in FIG. 1. The feedback connections for each of the counter circuits 60 and 62 have been omitted to simplify the diagram. In this example the circuits 60 and 62 are connected as divide by thirty circuits while circuit 61 is a divide by thirty-two circuit. With such an arrangement a progression of 2, 4, 8, 16, 32 pulses may be generated.

Specifically, in the embodiment of FIG. 3 the output of pulse source 64 is connected through gate 65 to circuit 62 with gate 65 being responsive to gate control flip flop 63. The gate 65 is initially closed in response to the signal which energizes pulse source 64.

Tht output of the last flip flop of circuits 60 and 61 is connected through RS flip flop 66 to AND circuit 67. The AND circuit 67, in response to the output of flip flop 66, allows pulses from multivibrator 64 to pass to the output of AND circuit 67. This output is connected through a gate 78 to the OR output circuit 68, to gate 69 and to flip flop 63. The gates 69 and 78 are controlled by trigger flip flop 70 which is responsive to the output of circuit 60, i.e., that counter of the pair which passes through zero first. Gate 69 connects the output of AND circuit 67 through a delay 71 to the first flip flop of circuit 62. The delay 71 is utilized to insure that pulses from gate 74 are not received by counter 60 simultaneously with pulses from pulse source 64. Circuits 61 and 62 are connected through RS flip flop 72 to AND circuit 73. The output of circuit 73 is connected through gate 79 to the input of OR circuit 68 and to gate 74. The gates 74 and 79 are controlled by trigger flip flop 75, which is responsive to the output of circuit 62 and connects the output of the AND circuit 73 through delay 76 to the first flip flop of circuit 60.

In operation with all flip flops initially set at zero the multivibrator 64 is started from a source, not shown, which closes gate 65 through control 63. The output of circuit 64 starts circuits 60 and 61 counting and after thirty pulses AND gate 67 is opened to initially allow two pulses from multivibrator 64 to pass to the gate 78. Since flip flop 70 opens gate 78 in response to the first output from counter 60, the two pulses are passed to OR circuit 68 and to output 77. Since circuit 60 is the divide by thirty circuit, every other time that counter 60 has a zero crossing the flip flop 70 opens gates 69 and 78. The first pulse of the output of circuit 67 also energizes flip flop 63 to open gate 65 so that counting circuit 62 is now connected to multivibrator 64 and starts a counting sequence. Since the two pulses from the AND circuit 67 have already been counted by counting circuit 62, circuit 62 now functions as a divide by twenty-eight circuit while circuit 61 continues to function as a divide by thirty-two circuit. The output of gate 73 will then be four pulses. Gate 79 in response to the first and every other output of counter 62 will allow these four pulses to pass through OR circuit 68 to the output 77. The four pulses simultaneously generated at the output of AND circuit 67 by counters 60 and 61 will not be connected to OR circuit 68 since gate 78 is closed in response to the second pulse series because of the operation of flip flop 70.

The flip flop 75 being responsive to every other output of circuit 62 opens gate 74 to allow the output pulses from 73 through delay 71 to be counted by counter 60. Thus, counter 60 will now function as a divide by twenty-four circuit. Since circuit 61 remains a divide by thirty-two circuit the output at 67 will be eight pulses which will appear at output 77. These pulses will also be impressed upon counter 62 so that counter 62 now functions as a divide by sixteen circuit. This results in an output at gate 73 and at output 77 of sixteen pulses. These sixteen pulses will also be impressed upon counter 60 which now functions as a divide by thirty-two circuit so that a total of thirty-two pulses are generated at the output and gate 67 which appears at output 77. In each of these operations the output of AND circuits 67 and 73 are alternately connected to the OR circuit 68 since gates 78 and 79 are alternately opened and closed. In this manner a geometric progression, 2, 4, 8, 16, 32, may be generated in a simple manner. It is apparent that by utilizing additional flip flops in each counter the maximum number in the progression may be increased. Further, by utilizing a difference of three, five, etc., between the master counter circuit 61 and the slave counter circuits 60 and 62, progressions 3, 6, 12, 24, 48, etc., 5, 10, 20, 40, etc., may be generated as well as others.

Although particular embodiments of the present invention have been described, various modifications will be apparent to those skilled in the art without departing from the scope of the invention. Further, while specific uses have been described to illustrate the preferred embodiments, other uses such as the sequential variation of the initial condition of electronic integrators, variable or progressive delays, and others may be made of the variable preset counter arrangement of the present invention. Therefore, the present invention is not limited to the specific embodiments disclosed but only by the appended claims.

I claim:

1. A system for generating pulses in preselected groups of increasing or decreasing numbers comprising a source of input pulses, a plurality of counting means responsive to said source for counting said input pulses, each of said counting means having a plurality of counting units, one of said counting means generating an output signal after $m$ input pulses, at least one other of said counting means generating an output signal after $n$ input pulses, and control means responsive to the outputs of said counting means for selectively connecting said source of input pulses to an output so that the number of pulses appearing at said output is a function of the difference between $n$ and $m$.

2. The system of claim 1 including feedback means for selectively connecting the output signal of at least one counting means to at least one of its counting units.

3. The system of claim 1 wherein said control means includes at least one AND means enabled by said output signal of said other counting means after $n$ counts and disabled by said output signal of said one counting means after $m$ counts.

4. The system of claim 3 wherein said at least one counting means includes first and second counting means, said control means including means responsive to the first output of said AND means for connecting said second counting means to said source of input pulses.

5. The system of claim 1 wherein said at least one counting means includes first and second counting means, said control means having a first and second AND means connected to said first and second counting means respectively, and first and second gate means connected and responsive to the output signal of said first and second counting means respectively for connecting the output of said first and second AND means to the first counting unit of said second and first counting means respectively.

References Cited

UNITED STATES PATENTS

| | | | |
|---|---|---|---|
| 2,997,234 | 8/1961 | Hughes | 235—92 |
| 3,056,548 | 10/1962 | De Lisle Nichols | 235—92 |
| 3,258,583 | 6/1966 | Davies | 235—92 |
| 3,359,406 | 12/1967 | Perry | 235—92 |

MAYNARD R. WILBUR, *Primary Examiner.*

GREGORY J. MAIER, *Assistant Examiner.*